United States Patent [19]

Honick

[11] Patent Number: 4,852,152
[45] Date of Patent: Jul. 25, 1989

[54] HIGH IMPEDANCE SIGNAL DETECTION DEVICE

[75] Inventor: Ronald J. Honick, Norcross, Ga.

[73] Assignee: Schlumberger Industries, Inc., Atlanta, Ga.

[21] Appl. No.: 109,857

[22] Filed: Oct. 19, 1987

[51] Int. Cl.$^4$ .......................................... H04M 11/00
[52] U.S. Cl. ..................................... 379/97; 379/106; 379/413
[58] Field of Search .................... 379/107, 106, 97, 98, 379/413, 104

[56] References Cited

U.S. PATENT DOCUMENTS

| | | | |
|---|---|---|---|
| 3,962,545 | 6/1976 | Abe ..................................... | 379/107 |
| 3,993,875 | 11/1976 | Ebner et al. ....................... | 379/107 |
| 4,394,540 | 7/1983 | Willis et al. ....................... | 379/104 |
| 4,540,849 | 9/1985 | Oliver ................................. | 379/104 |
| 4,644,103 | 2/1987 | Rosenfeld ........................... | 379/104 |
| 4,654,868 | 3/1987 | Shelley ............................... | 379/106 |
| 4,674,113 | 6/1987 | Brennan, Jr. et al. ............. | 379/107 |
| 4,691,344 | 9/1987 | Brown et al. ...................... | 379/106 |

OTHER PUBLICATIONS

Lancaster, *CMOS Cookbook*, ©1977, pp. 359-371, 103.

*Primary Examiner*—Jin F. Ng
*Assistant Examiner*—Wing F. Chan
*Attorney, Agent, or Firm*—Needle & Rosenberg

[57] ABSTRACT

A low power consuming signal detection device for attachment to a telephone line. The device has an impedance of at least five megohms across the telephone lines. The device includes a power supply having an input impedance of least five megohms and an amplifier powered by the power supply for amplifying tone interrogation signals present on the telephone line. A phase-locked-loop is responsive to the amplifier signals for determining when the frequency of the amplified signals are within a predefined bandwidth. Phase locking of the phase-locked-loop to the amplified signals is detected by a lock detector when the frequency of the signals falls within a predetermined bandwidth for a predetermined period of time. The lock detection signal is used to place meter reading circuitry in an "off-hook" condition and for effecting the transfer of data from meter data collection apparatus over the telephone line back to a remote location. The signal detection device is solely powered by the normal telephone central office power supply which is applied to the telephone line. Circuitry is provided for temperature compensating the phase-locked-loop to provide a relatively stable source of reference signals for the phase-locked-loop.

11 Claims, 2 Drawing Sheets

HIGH IMPEDANCE SIGNAL DETECTION DEVICE

BACKGROUND OF THE INVENTION

The present invention relates to signal detection means which enables information, such as utility usage, to be directed along telephone lines when an interrogation signal is received on the same lines. More particularly, the invention disclosed herein pertains to a very low power consuming signal detection device which is attached to a customer's telephone lines. The device senses a signal directed to it from a central office while in the on-hook (low current) condition and activates other circuitry, such as a meter reading apparatus, to operate in the off-hook (high current) condition. The terms "on-hook" and "off-hook" are commonly used in the telephone industry to describe the operating condition of a telephone or other device connected to a telephone line. In the normal state, the handset is on-hook and the switch disconnects the telephone from the line. In this open circuit condition, no current flows from the battery supply at the telephone central office to the telephone. However, when the receiver is lifted off-hook, the telephone is connected to the line and current flows.

Over the past two decades numerous automatic meter reading systems have been innovated. Such systems rely on radio, telephone, cable TV, fiber optics, power lines and even free space optical communication to transfer data from a remote source to a central point for processing. Although a number of systems have proven technically feasible, the high cost of such systems has precluded widescale acceptance in the marketplace. More recently, automatic meter reading systems which utilize existing telephone networks to access individual utility meters have proven cost effective for the first time. Such meter reading systems have many important advantages. First, the telephone lines are already in place and are juxtaposed to approximately 96% of all the utility meters in the United States. Second, utilization of telephone lines for modem to modem communications between computers has long proven a very reliable means of data transfer. Third, all telephone lines are connected to a central battery source which can provide small amounts of power to communication electronics located at the customer's premise.

A number of prior art patents have disclosed systems which utilize non-dedicated telephone lines as a means to access devices for reading meters at the customer premises from a central location. One such patent is Willis et al., U.S. Pat. Ser. No. 4,394,540, which discloses a meter reading device for reading and transmitting meter data in response to a call from the central office. This device isolates the customer's telephone for a period of time each day, at which time it intercepts each call to determine if it is a request for meter data. The device answers the call, sends a signal back to the central office, and awaits a confirmatory signal. If the call is not for data, the device artificially generates a ring on the customer's telephone. Thus, the system delays and perhaps masks normal calls to the subscriber. This system is unduly complex and expensive for broadscale development in an automatic meter reading system and requires that a clock in each unit be coordinated with the central computer. Also, the time delays involved in accessing data in such a manner may be practically and financially disadvantageous. U.S. Pat. Ser. No. 4,654,868 to Shelley is similar to Willis et al. in that it intercepts the first ring to the customer's telephone. However, in Shelley the system is always operable. If, and only if, a single ring is transmitted to the system, it calls back the central computer to send data. The need for a telephone dialing device and other circuit components in each customer unit adds to the total cost required to effect this mode of operation. The system also has the disadvantage that the time to complete a data request in this manner is unnecessarily long.

U.S. Pat. Ser. No. 4,540,849 to Oliver discloses a system which allows a much simpler unit to be located at the customer's meter. The central computer utilizes special test trunk equipment in the telephone central office to send a special interrogation signal which is detected by a meter interface unit located near the customer's meter. This type of test trunk access provides a communication path to the customer's premise without ringing the telephone. In order for the meter interface unit to operate without interfering with normal calls, the device draws a relatively low level of power from the telephone line. The difficulty with this disclosure is that it does not deal with the fact that U.S. federal regulation limits the power that may be drawn from inactive customer lines to an extremely low level considered beyond the state of the art. The current regulation, 47 C.F.R. 68.312, requires that a device attached to the phone lines have an effective on-hook DC resistance between tip and ring of greater than 5 megohms. This corresponds to only 9.6 microamps of available supply current at 48 volts.

A patent issued to Rosenfeld, U.S. Pat. Ser. No. 4,644,103, discloses an attempt to satisfy the extremely low limits which the regulations place on drawing current from the telephone lines. In this patent a periodic circuit draws current from the telephone lines at a permissible rate to charge a capacitor over a relatively long time. For a minor portion of each cycle this stored charge is used to briefly operate the tone detection circuit. If a tone is sensed, the unit activates for meter reading. The difficulty with this design is that the signal tone must be three to four seconds long in order to be certain that the tone detection circuit will be operable during a portion of the tone duration. This three to four second response time results in lower throughput of readings by the central computer, as well as increased usage fees by the telephone company when tariffs are based on the time central office equipment is in use.

Consequently, there was still a need for an inexpensively constructed, telephone line powered tone detection device which allows meter reading equipment at individual meters to be efficiently accessed while complying with the law and causing minimal interference with normal customer telephone use. No prior art tone detection circuits were available which would operate within the low current supply requirements while avoiding the problems of noise susceptability and temperature dependence.

SUMMARY OF THE INVENTION

The present invention is a high impedance signal detection device intended to be powered by telephone lines and to detect a signal of a defined frequency on the line. More specifically, the present invention is based around a phase-locked-loop circuit which utilizes a high impedance power supply and temperature compensation circuitry to enable the device to operate satisfactorily under the low current conditions required and in an outdoor climate.

The power supply for the circuitry of the signal detector derives its power from the 48 volts supplied across the ring and tip of the phone line, and provides the necessary power to the circuit while maintaining at least 5 megohm DC impedance over the range of 10 to 100 volts on the phone line and over a temperature range from −40° C. to +85° C. Due to such limits CMOS circuitry may be utilized, since it typically draws very low levels of supply current at operating voltages as low as 3.0 volts. The power supply, then, comprises a junction field-effect transistor (JFET) whose gate-to-source voltage may be in the range of 3.0 to 3.8 volts. It has been determined that a greater than 10 megohm tone detector DC impedance can be maintained when operating within this voltage range. Since the load on this voltage source is quite constant, no voltage regulation is required.

A signal amplifier amplifies the interrogation signal on the phone line and couples that amplified tone to a phase comparator portion of a phase-locked-loop. An output signal from a voltage controlled oscillator furnishes a reference signal to the other input of the phase comparator. The output from the phase comparator, or error signal, is a variable DC voltage that represents the frequency and phase differences between a signal on the phone line and the voltage controlled oscillator output. This error voltage is integrated to furnish a control voltage for the voltage controlled oscillator, whose output frequency is proportional to the control voltage. This error voltage is also applied to a lock detector. Whenever an alerting signal is within the bandwidth, or operating range, of the phase-locked-loop, the voltage controlled oscillator's output is adjusted to be the identical frequency, the resultant error signal is nulled, and locked indication is given by the lock detector. If, however, the input signal is too far removed from the capture range of the phase-locked-loop, the frequency of the voltage controlled oscillator will not be able to track the input signal, the error will not be nulled, and an unlocked indication will be given by the lock detector. The locked indication is used to denote the presence of an appropriate interrogation tone and, subsequently, to activate an associated responsive transmitter.

A temperature dependency problem is encountered with some prior art approaches. The free-running frequency of the voltage controlled oscillator is determined by a combination of resistance (R) and capacitance (C) of certain components of the voltage controlled oscillator. In order to satisfy the impedance requirements, very large values of resistance combined with very small values of capacitance are necessary for minimizing power consumption. However, the use of such small values of capacitance results in a high degree of temperature dependency when used to set the frequency of the oscillator.

A temperature compensation design is employed to minimize frequency variations over the operating temperature range. As the temperature increases, the frequency of an oscillator, such as a CMOS integrated circuit operating as an astable multivibrator, typically increases. This effect becomes more pronounced due to the low currents being employed. However, in the present invention, a varicap diode, whose capacitance is voltage controlled, is used as the primary frequency determining element. The varicap diode exhibits a temperature coefficient such that as the temperature increases, its capacitance also increases, thus tending to lower the oscillator's frequency. By carefully selecting the component values, the temperature characteristics of the varicap are made to offset and cancel the temperature characteristics of the rest of the oscillator. Normally, the relatively small values of capacitance afforded by varicap diodes would hardly be suitable for controlling the frequency of a voltage controlled oscillator in the low audio range. However, the large values of resistance make such a small change in capacitance quite effective in controlling the voltage controlled oscillator over a wide frequency range, thereby achieving temperature stability.

The signal detection device thus described may be used in a utility meter interface unit along with a microprocessor and a modem to communicate usage data on the phone lines. When the signal detection means senses the interrogation signal sent from a central computer through the telephone lines, the meter interface unit is directed to activate the off-hook condition, drawing about 17 millamps. The meter interface unit is then powered by a central office battery supply via the telephone lines while the data is collected and sent to the central computer.

Therefore, it is an object of the present invention to provide a signal detection device which has very high impedance but is continuously operable with a quick response.

It is a further object of this invention to establish a path for communicating data from a customer's premise to a central location without interfering with telephone service or ringing the telephone.

It is yet a further object of this invention to provide a signal detection device which operates within the requirements of federal regulations when attached across a telephone line in an on-hook condition.

It is still a further object of this invention to provide such a high impedance signal detection device which is stable over a wide variation in operating temperatures.

It is another object of this invention to provide a signal detection device which meets the very low cost requirements of an automatic meter reading system.

These and other objects and advantages will appear from the following description with reference to the drawings.

DESCRIPTION OF THE PREFERRED EMBODIMENT

The preferred embodiment is now described with reference to the drawings.

Figure 1:
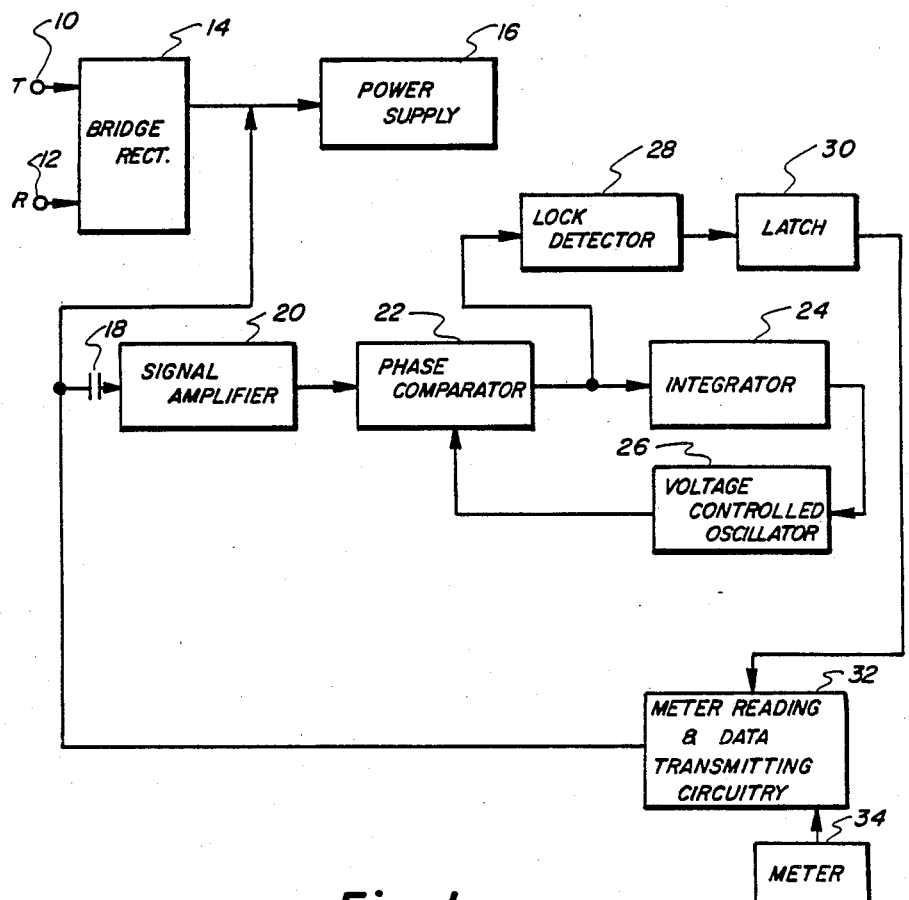
FIG. 1 is a functional block diagram of a preferred embodiment of the signal detector device.

FIG. 1 is a block diagram showing the main functional elements of the signal detection device. The nominal −48 volt telephone voltage across TIP 10 and RING 12 is applied to a bridge rectifier 14 to provide polarity reversal insensitivity. This rectified 48 volt signal is then directed to power supply 16, which produces a constant voltage of about 3.5 volts; which is used to power other components of the signal detector. This low voltage is necessary to minimize current consumption while meeting minimum operating specifications for integrated circuits utilized in the device.

A signal amplifier 20 is AC-coupled to the rectified phone line through a capacitor 18 to block out the DC component. The amplified signal is then directed to the phase-lock-loop circuitry, which is comprised of a phase comparator 22, integrator 24, and voltage controlled oscillator 26. As described above, the phase-locked-loop is a feedback circuit wherein oscillator 26 provides a reference signal which is supposed to oscillate at the frequency of the signal to be detected. In the present embodiment the voltage controlled oscillator reference signal can be varied by ±6% so that signals within that bandwidth may be detected. By comparison of the two signals in the phase comparator 22, an error signal 23 is generated which is fed back to oscillator 26. In this manner, when a signal is sensed in the desired bandwidth, the phase-lock-loop generates an identical signal to lock-in the reference signal.

When the two signals are locked for some time, such as ½ second, this is detected by lock detector 28 which compares the phase differences between the signals. The duration of the loop's locked state needed to result in a locked indication is determined by an RC time constant and may be set to be much shorter or longer than the ½ second mentioned. The actual time duration is selected to minimize throughput time while reducing the possibility of false activations. Latch 30 is a conventional flip-flop which, when signalled by the lock detector, enables the meter reading and data transmission circuitry 32 to read a meter 34.

Figures 2, 2A:
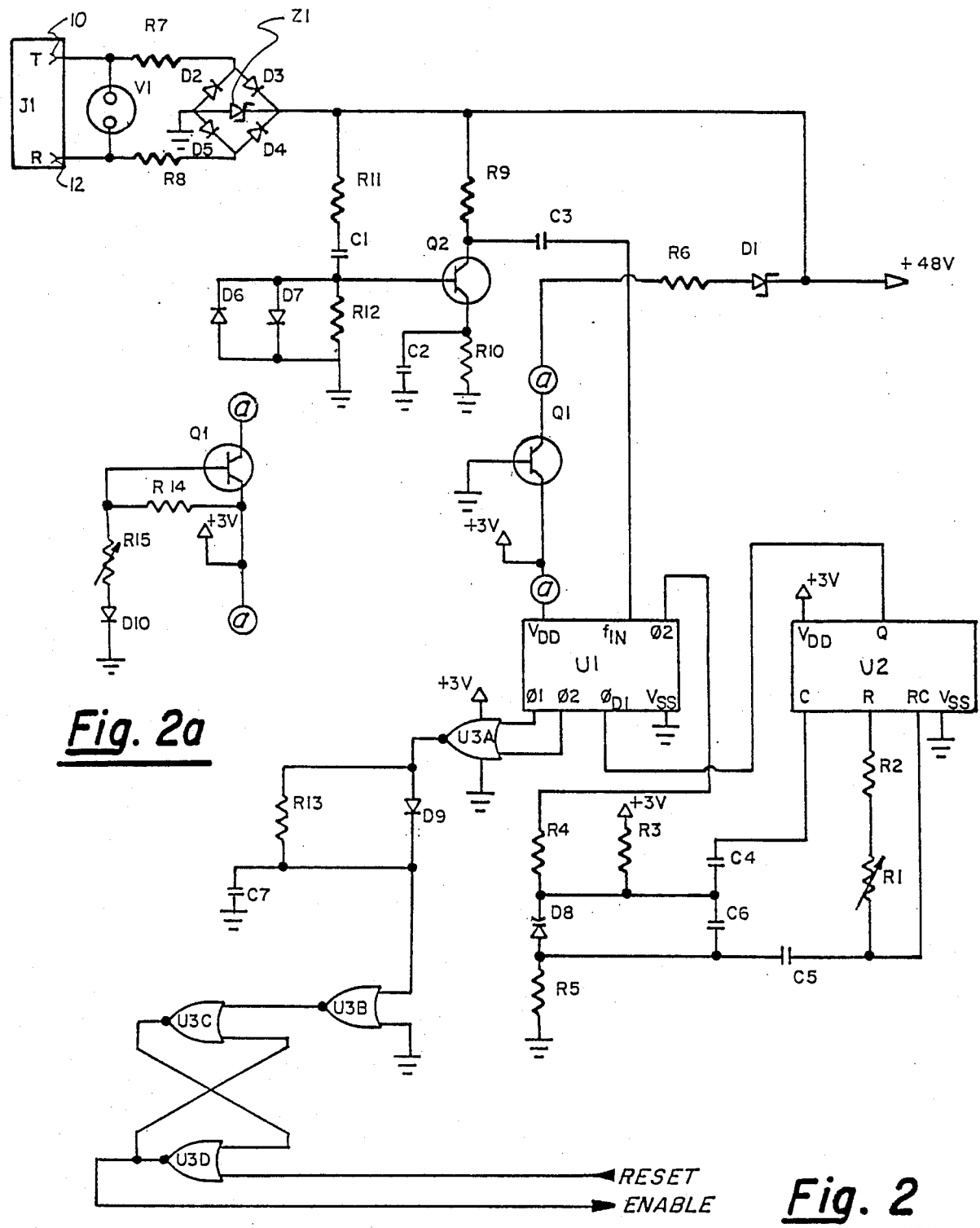
FIG. 2 is a more detailed circuit diagram showing the electronic components utilized in a preferred embodiment of the present invention.
FIG. 2A is an alternate portion of the circuit diagram of FIG. 2 illustrating an alternative embodiment, to be substituted between points a—a in FIG. 2.

FIG. 2 is a more detailed circuit diagram showing the present invention at the level of the component elements and integrated circuits. Connection to the telephone line is made across TIP 10 and RING 12 from connector J1. Diodes D2, D3, D4, D5 comprise a bridge rectifier used for providing reverse polarity protection. The gas tube V1 and transorb Z1 provide metallic transient and surge protection. Resistors R7 and R8 limit the maximum current across Z1 to safe values.

The DC output voltage from the bridge rectifier is supplied to the drain of JFET Q1, through resistor R6 and zener diode D1. As previously discussed, JFET Q1 functions as a low voltage constant voltage source for supplying power to the tone detector circuitry.

Two approaches may be utilized for insuring the voltage output from Q1 to be in the desired range of 3.0 to 3.8 volts. In the first approach, specific JFET components with the desired gate-to-source cutoff voltage parameter can be selected to result in a 3.0 to 3.8 volt output with the gate grounded. In the second approach, by using additional circuit components, as shown in the substitute FIG. 2A, the gate-to-source voltage of Q1 may be adjusted to achieve the desired 3.0 to 3.8 volt output. In this method, the gate-to-source parameter of Q1 (over a large sample of actual JFET components) may have a greater variance than in the first approach, thus allowing a much greater yield in the selection of Q1. The output voltage from the source of Q1 is applied to a voltage divider chain comprised of R14, potentiometer R15, and D10. By varying the resistance of R15, the gate voltage to Q1 may be adjusted, which, in turn, controls Q1's source voltage. Diode D10 is used to provide temperature compensation. R6 insures that the minimum 5 megohm impedance is maintained even in the advent of catastrophic failure. Zener diode D1, which only conducts above 13 volts, prevents circuit operation below this voltage and helps maintain acceptable impedance specifications at minimum testing voltages.

JFET Q2 serves as a common-source AC-coupled amplifier. The extremely large value drain and source resistors, R9 and R10 respectively, maintain a high impedance across the rectified telephone line voltage. The alerting tone is AC-coupled through resistor R11 and capacitor C1 to the gate of JFET Q2. Diodes D6, D7, and resistor R12 serve to limit the maximum signal input to the gate of JFET Q2. This protects the amplifier from the high voltage signals induced when the central office attempts to ring the telephone.

The amplified output signal from the drain of JFET is AC-coupled through capacitor C3 and fed into the signal input of the phase comparator integrated circuit U1. The other input to the phase comparator U1 is furnished from the Q-output of the voltage controlled oscillator integrated circuit U2.

As previously mentioned, the voltage controlled oscillator is essentially an RC-controlled, a stable multivibrator configured around integrated circuit U2. The oscillator's free-running frequency is determined by the series resistance of resistors R1 and R2, and the parallel capacitance of capacitors C6 and varicap D8. The capacitance from varicap D8 is determined by the dc voltage across it. Resistors R3 and R5 set the steady-state bias voltage across varicap D8 to half the 3 volt supply voltage. The error voltage output from the phase comparator U1 through resistor R4, supplies a control voltage across varicap D8 and closes the loop. The integrating action of elements R4, D8, and C6 serves to smooth the error voltage to a stable controlling signal for phase-lock-loop. Capacitors C4 and C5 serve merely to block the path of DC to the oscillator's RC inputs.

NOR gate U3A serves to compare the phase differences between the output of comparator U1 and the locked input signal phases. The resultant output from gate U3A is a variable pulse width signal dependent upon this phase relationship. The operation of the phase comparator U1 is such that when the phase-lock-loop is locked, the output from gate U3A is at a logic low except for some very small pulses resulting from any phase differences. As the phase differences increase, these output pulses increase in width until the output from gate U3A is at a logic high when the phase-lock-loop is unlocked. Resistor R13 and capacitor C7 function as a filter to establish the point, or pulse width, that invertor U3B recognizes as a locked condition. The time constant determined by resistor R13 and capacitor C7 also determines the length of time the phase-lock-loop must be locked in order to result in a locked indication at the output of invertor U3B. Diode D9 serves merely to bypass this time delay when the phase-lock-loop goes out of lock.

The remaining gates U3C and U3D are configured into a conventional flip-flop, or latch, driven from the output of the lock detector U3B. When the phase-lock-loop is locked, the output of gate U3D goes to a logic high and enables the meter reading and data transmission circuitry.

One set of values or types of components in FIG. 2 which embody the invention is listed below (resistances in ohms, capacitance in microfarads, unless otherwise stated):

| | | |
|---|---|---|
| R1 | 1 M | |
| R2 | 7.50 M | 1% |
| R3 | 10 M | 1% |
| R4 | 3.32 M | 1% |
| R5 | 10 M | 1% |
| R6 | 5.1 M | |
| R7 | 47 | 1 watt |
| R8 | 47 | 1 watt |
| R9 | 22 M | |
| R10 | 10 M | |
| R11 | 100 K | |
| R12 | 1 M | |
| R13 | 5.1 M | |
| R14 | 5 M | |
| R15 | 5 M | |
| D1 | 1N964A | |
| D2–D5 | 1N4007 | |
| D6–D7, D10 | 1N4148 | |
| D8 | MV2111 | 33 pF |
| D9 | 1N458A | |
| Q1 | 2N5486 | |
| Q1 substitute | 2N5485 | |
| Q2 | 2N5486 | |
| U1 | SGS HCF4046BE | |
| U2 | SCL 4047 BE | |
| U3 | MC14001 BCP | |
| V1 | CG2-300L | |
| Z1 | 1.5KE250 | |
| C1 | .01 | |
| C2 | .01 | |
| C3 | .001 | |
| C4 | .001 | |
| C5 | .001 | |
| C6 | 22 pF | |
| C7 | .1 | |

While the invention has been described in detail with particular reference to the preferred embodiment thereof, it will be understood that variations and modifications can be effected within the spirit and scope of the invention as previously described and as defined by the claims.

What I claim is:

1. A high impedance telephone line signal detection device powered by a telephone line in an on-hook condition, comprising:
    means for supplying power within the detection device with an impedance of at least 5 megohms across the telephone line;
    means for amplifying a signal having at least one predetermined frequency on the telephone line, the amplifying means being AC-coupled to the telephone line with an impedance such that the impedance across the telephone line of said power supply means and said amplifying means together is at least 5 megohms;
    phase-locked-loop signal sensing means, powered by said power supply means, for determining when the frequency of said signal amplified by said amplifying means is within a predefined bandwidth;
    lock detection means for outputting a control signal when the frequency of said amplified signal from the telephone line is within said predefined bandwidth for a predetermined period of time; and said power supply means comprises a junction field effect transistor with a gate-to-source cutoff voltage of sufficient level to supply power to operate said phase-locked-loop signal sensing means and said lock detection means.

2. The detection device of claim 1, wherein said junction field effect transistor has a gate-to-source cutoff voltage between 3.0 and 3.8 volts.

3. The detection device of claim 2, wherein said phase-locked-loop signal detection means comprises CMOS integrated circuitry.

4. The detection device of claim 2, wherein said resistor of at least 5 megohms resistance is in series between the telephone line and the drain of said junction field effect transistor.

5. The detection device of claim 1, wherein the phase-locked-loop signal sensing means comprises a voltage controlled oscillator means, including resistive and capacitive components, for generating a reference signal whose frequency is inversely proportional to the RC value of said components.

6. The detection device of claim 6, wherein said resistive components have a resistance of a least 5 megohms and said capacitive components have complementary values to generate said reference signal frequency.

7. The detection device of claim 5, wherein said voltage controlled oscillator comprises means for compensating for temperature variations in order to minimize frequency variations in the reference signal.

8. The detection device of claim 7, wherein said temperature compensation means comprises a varicap diode as a capacitive component of the voltage controlled oscillators such that as the temperature increases, the capacitance of the varicap diode increase, tending to lower said oscillator's frequency in compensation of the tendency of an increase in temperature to cause the remainder of the oscillator to increase its frequency.

9. The detection device of claim 8 wherein said varicap diode is in the portion of the circuit which determines the frequency of said oscillator.

10. The detection device of claim 1, wherein said means for supplying power has an impedance of at least 10 megohms.

11. A telephone line signal detection device which is powered by a telephone central office battery, comprising:
    means for amplifying signals on the telephone line;
    means for generating a stable reference voltage and for converting said voltage to a proportional frequency of oscillation;
    means for comparing the frequency of said amplified telephone line signals to said frequency of oscillation and generating a control signal when the difference between the two frequencies falls within a preselected range; and
    means, which draws less than 5.0 microamperes of current, for converting telephone line battery potential to a supply voltage, wherein said converting means comprises a junction field effect transistor with a gate-to-source cutoff voltage of sufficient level to supply supply voltage to operate said amplifying means, said reference voltage generating means, and said frequency comparing means.

* * * * *